United States Patent [19]

Matumoto et al.

[11] Patent Number: 5,206,984
[45] Date of Patent: May 4, 1993

[54] APPARATUS FOR MOUNTING A BALANCE WEIGHT ON A TIRE WHEEL

[75] Inventors: Sigeru Matumoto; Nobuo Kotaki, both of Tokyo, Japan

[73] Assignee: Kokusai Keisokuki Kabushiki Kaisha, Tokyo, Japan

[21] Appl. No.: 849,947

[22] Filed: Mar. 12, 1992

[30] Foreign Application Priority Data

Jun. 20, 1991 [JP] Japan .................................. 3-176140

[51] Int. Cl.$^5$ ........................ B23P 21/00; B23Q 7/10
[52] U.S. Cl. ........................................ 29/705; 29/802; 29/818; 29/281.1; 73/458; 301/5.21
[58] Field of Search ................. 29/894, 509, 525, 802, 29/818, 705, 281.1; 73/458, 468, 470; 301/5 B, 5 BA

[56] References Cited

U.S. PATENT DOCUMENTS

| | | | |
|---|---|---|---|
| 3,623,208 | 11/1971 | Hofman | 29/407 |
| 4,554,734 | 11/1985 | Sander | 29/818 |
| 4,861,214 | 8/1989 | Sander | 29/809 X |
| 4,903,398 | 2/1990 | Sakamoto et al. | 29/818 X |

Primary Examiner—Timothy V. Eley
Attorney, Agent, or Firm—Kane, Dalsimer, Sullivan, Kurucz, Levy, Eisele and Richard

[57] ABSTRACT

The present invention relates to a balance weight mounting apparatus for a tire wheel by which a balance weight can be automatically mounted on the tire wheel. A six-axes manipulator has a weight holder and hammer head provided at the distal end of the arm thereof. The weight holder and the hammer head can be moved by the operation of the manipulator to the location to which a balance weight is fed by a parts feeder and also can be moved within the plane perpendicular to the circumferential direction of a tire wheel supported by a tire wheel support unit. The balance weight of a predetermined weight fed by the parts feeder is gripped by the weight holder 32, abutted against that portion of the rim, on which this balance weight is to be mounted, of the tire wheel supported by the tire wheel support unit, and then mounted thereon by being driven by the hammer head.

11 Claims, 10 Drawing Sheets

APPARATUS FOR MOUNTING A BALANCE WEIGHT ON A TIRE WHEEL

BACKGROUND OF THE INVENTION

The present invention relates to an apparatus for mounting a balance weight on a tire wheel, more specifically to a balance weight mounting apparatus for a tire wheel by which a balance weight having a weight portion and a clip portion is mounted on the rim of a tire wheel through the clip portion.

In general, a balance weight is fixed to or mounted on the outer circumference of the rim of the tire wheel of a vehicle in order to correct the unbalanced rotation of the tire wheel.

The balance weight is composed of a weight portion and a clip portion and is fixed by clamping the outer circumference of the rim between the weight portion disposed along the outer surface of the rim of the tire wheel and the clip portion. This balance weight is mounted on the tire wheel by a worker who manually strikes the clip portion with a hammer so as to deform it to wrap the outer edge of the rim of the tire wheel.

Nevertheless, the above conventional mounting operation of the balance weight is wrong in workability and monotonous, and in particular, when the balance weight must be mounted for a tire of a large size, the mounting operation is dangerous and inefficient because the tire wheel has a heavy weight, and moreover it is very unreasonable to manually carry out only the mounting process regardless of that other processes such as the process for measuring a tire balance and the like are automatically carried out.

Therefore, there is an earnest desire for automatically carrying out this process and the development of an apparatus, which can automatically mount a balance weight on a tire wheel securely and promptly as if the balance weight was manually mounted thereon by a worker, has been desired.

SUMMARY OF THE INVENTION

The present invention is contrived in light of the above mentioned circumstances, and it is therefore an object of the present invention to provide a balance weight mounting apparatus for a tire wheel capable of automatically mounting a balance weight on a tire wheel.

In order to accomplish the above-mentioned object, according to one aspect of the present invention, there is provided a tire wheel balance weight mounting apparatus for mounting a balance weight having a weight portion and a clip portion on a rim of a tire wheel through said clip portion, said apparatus comprising weight holding means for holding said balance weight in a prescribed attitude, moving means for moving the weight holding means so that the balance weight held by said weight holding means is set to be abutted against the outer edge of the rim, and hammering means for hammering the clip portion of said balance weight held by said weight holding means to the rim side.

The above and other objects, features and advantages of the present invention will become apparent from the following detailed description which is to be read in conjunction with the accompanying drawings.

DETAILED DESCRIPTION OF PREFERRED EMBODIMENT

Hereinafter, one embodiment of a balance weight mounting apparatus for a tire wheel according to the present invention will be described below in detail with reference to the drawings.

Figure 1:
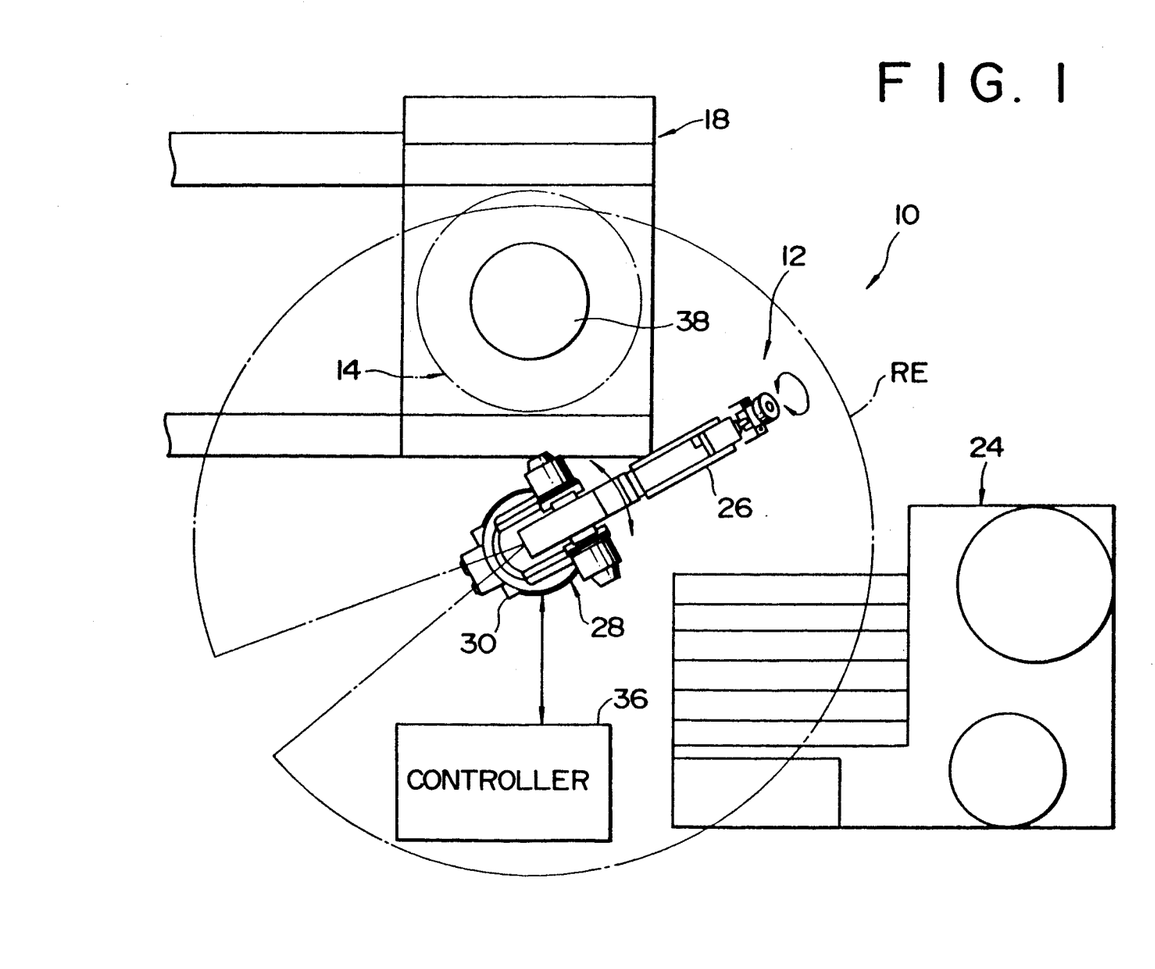
FIG. 1 is a plan view of a balance weight driving system to which one embodiment of a balance weight mounting apparatus for a tire wheel according to the present invention is applied.

FIG. 1 is a plan view showing the schematic arrangement of a balance weight driving system 10 employing one embodiment of a balance weight mounting apparatus 12 for a tire wheel 14 according to the present invention. The balance weight driving system 10 is provided with the balance weight mounting apparatus 12 for executing a mounting operation of a balance weight 16 (shown in FIGS. 2 and 3) to the tire wheel 14, a tire wheel support unit 18 on which the tire wheel 14 having a rim 20 and a tire 22 attached to the outer periphery of the rim 20 (shown in FIG. 2) is supported and a parts feeder 24 for supplying the balance weight 16 to a predetermined location. The tire wheel support unit 18 and the parts feeder 24 are disposed within the turning range RE of an arm 26 of a manipulator 28 which is included in the balance weight mounting apparatus 12.

Figure 2:
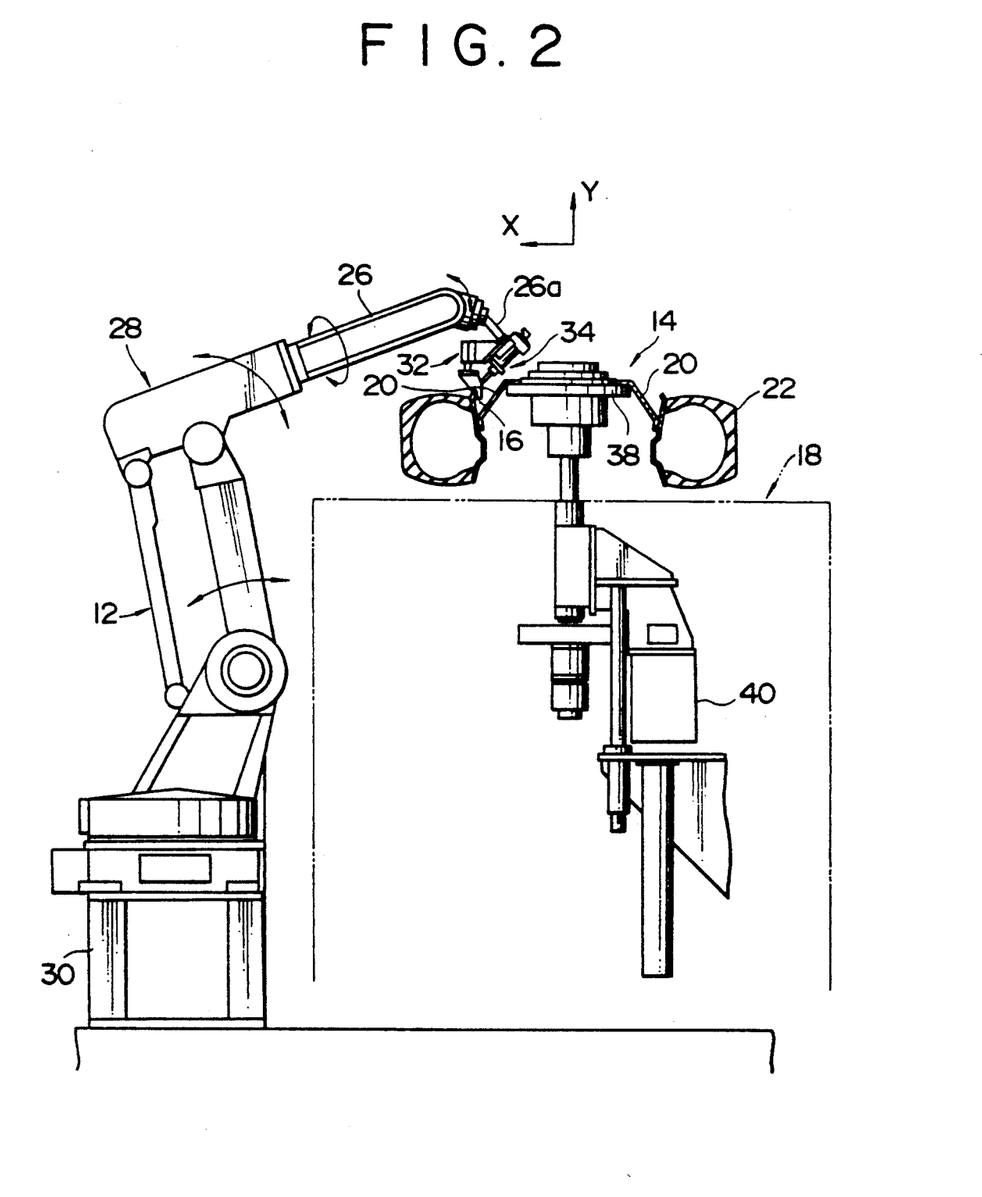
FIG. 2 is an overall side view of a balance weight mounting apparatus of one embodiment.

As shown in an overall side view of FIG. 2, the manipulator 28 includes a main body 30 settled on a base on the ground, the arm 26 attached to the main body 30 and movable so as to having a six-axes freedom, and a moving mechanism (not shown) for moving the arm 26 to the predetermined position within the turning range RE. The balance weight mounting apparatus 12 further includes a weight holder 32 and a hammer head 34 both attached to a distal arm portion 26a of the arm 26 of the six-axes manipulator 28.

The weight holder 32 is constructed so as to be moved to the location to which the balance weight 16 is fed by the parts feeder 24 by the operation of the manipulator 28, hold the balance weight 16 fed by the parts feeder 24, and transfer the balance weight 16 held thereby to that position on the outer periphery of the rim 20 on which the balance weight 16 is to be mounted. The hammer head 34 is constructed so as to be capable of driving the balance weight 16 held by the weight holder 32 within a plane perpendicular to a tangent which touches the circumferential surface of the rim 20 of the tire wheel 14 at a position where the balance weight 16 is to be mounted, while the tire wheel 14 is supported by the tire wheel support table 20.

The manipulator 28, weight holder 32 and hammer head 34 are connected to and controlled by a controller 36 (shown in FIG. 1). The controller 36 controls such that the weight holder 32 grips a weight portion 42 (described later) of the balance weight 16 with a predetermined weight fed by the parts feeder 24, the gripped balance weight 16 is caused to be abutted against the mounting portion of the rim 20 of the tire wheel 14 supported by the tire wheel support table 20 and then mounted by driving a clip portion 44 (described later) of the balance weight 16 by the hammer head 34.

Note that the tire wheel support table 20 includes a turning table 38 for rotatably supporting the tire wheel 14 disposed thereon, a lifter 40 capable of moving upward and downward the turning table 38, and a rotating mechanism (not shown) for rotating the turning table 38. The rotation of the turning table 38 causes that portion of rim 20 of the tire wheel 14 to which the balance weight 16 is to be mounted to be rotated to a predetermined location confronting the balance weight mounting apparatus 12.

Figure 3:
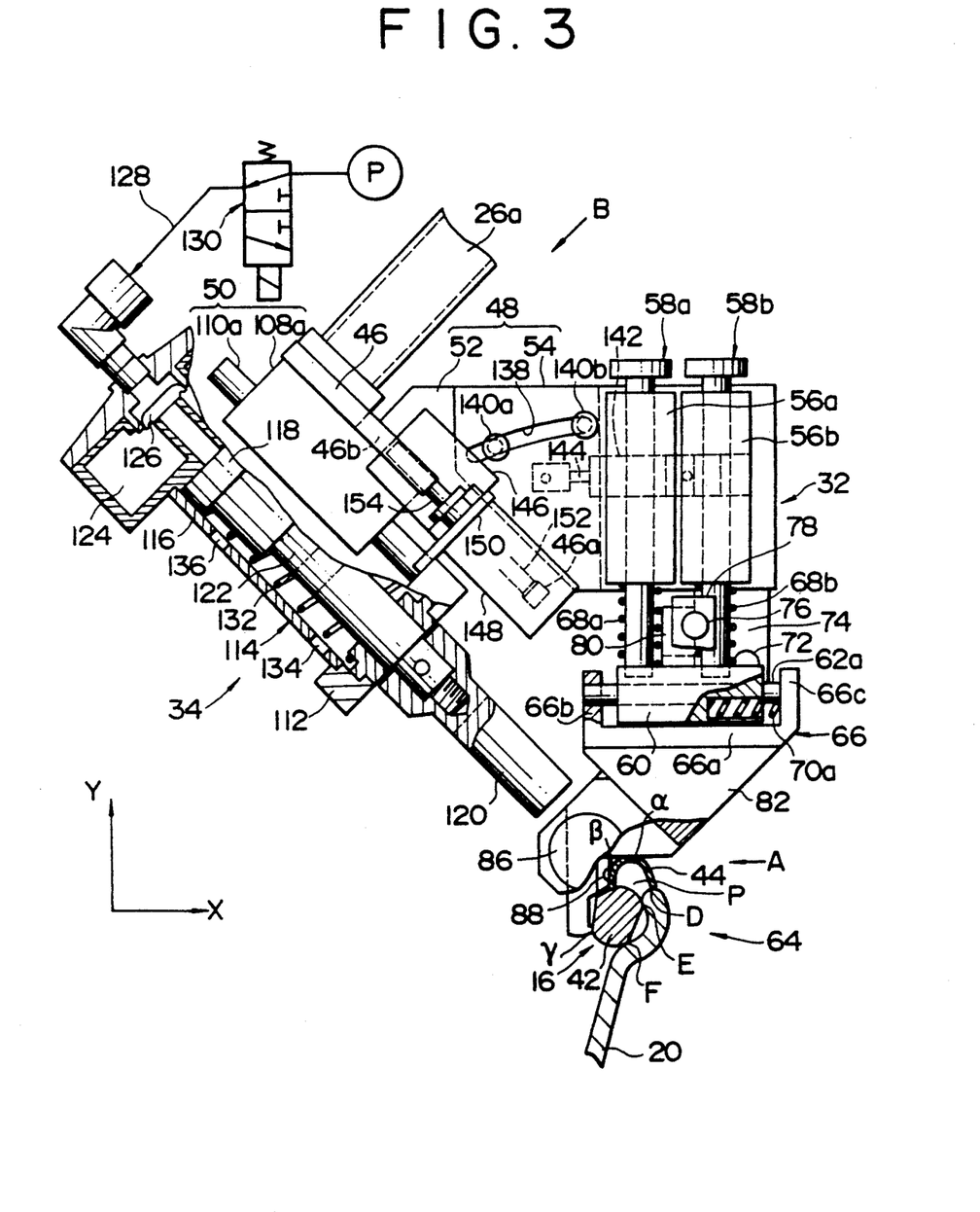
FIG. 3 is an enlarged back view of a weight holder and hammer head portion when a balance weight is attached to the rim of the tire wheel.

As shown in the partially enlarged view of FIG. 3 showing the state of the balance weight 16 abutted against the rim 20 of the tire wheel 14, the balance weight 16 is comprised of a weight portion 42 having a predetermined weight and a clip portion 44 integrally connected to the weight portion 42. More specifically, the clip portion 44 is formed to be arched and extends over about 180 degrees. In other words, the clip portion 44 is arcuated so as to constitute an arch of the substantial half-circle. That is, a predetermined openign P is defined between the distal end D of the clip portion 44 and the shoulder portion E of the weight portion 42, which shoulder portion E is restricted on the side where the clip portion 44 extends.

It should be noted that the clip portion 44 is driven by the hammer head 34 such that the rim 20 of the tire wheel 14 is fitted into the opening P, thereby mounting the balance weight 16 on the rim 20.

Hereinafter, the description about the weight holder 32 and hammer head 34 will be given with reference to FIGS. 3 through 7. Note that FIG. 3 is a diagram of the reverse view of the diagrams shown by FIG. 2 and FIGS. 8 to 10 to be described below (i.e., viewed from the backside).

At first, as shown in FIG. 3, to the distal arm portion 26a of the arm 26 is fixed a supporting plate 46. The weight holder 32 is attached to the supporting plate 46 through an angle adjustable unit 48 which can adjust the attaching angle of the weight holder 32 relative to the distal arm portion 26a. On the other hand, the hammer head 34 is attached to the supporting plate 46 through a slide support unit 50 which can slidable support the hammer head 34 relative to the supporting plate 46.

Note that the constructions of the angle adjustable unit 48 and slide support unit 50 are described in detail later, however, the angle adjustable unit 48 includes a stationary bracket 52 fixed to the supporting plate 46 and a swingable bracket 54 rotatably attached to the stationary bracket 52.

The weight holder 32 includes a pair of slide bearings 56a and 56b which are arranged along a radial direction X of the tire wheel 14 and provided to the distal end of the swingable bracket 54. The central axes of the slide bearings 56a and 56b are set to be parallel to each other and extend in a central axial direction Y of the tire wheel 14. A pair of first guide shafts 58a and 58b are inserted into the slide bearings 56a and 56b, respectively, and slidably supported in the central axial direction Y.

Figure 4:
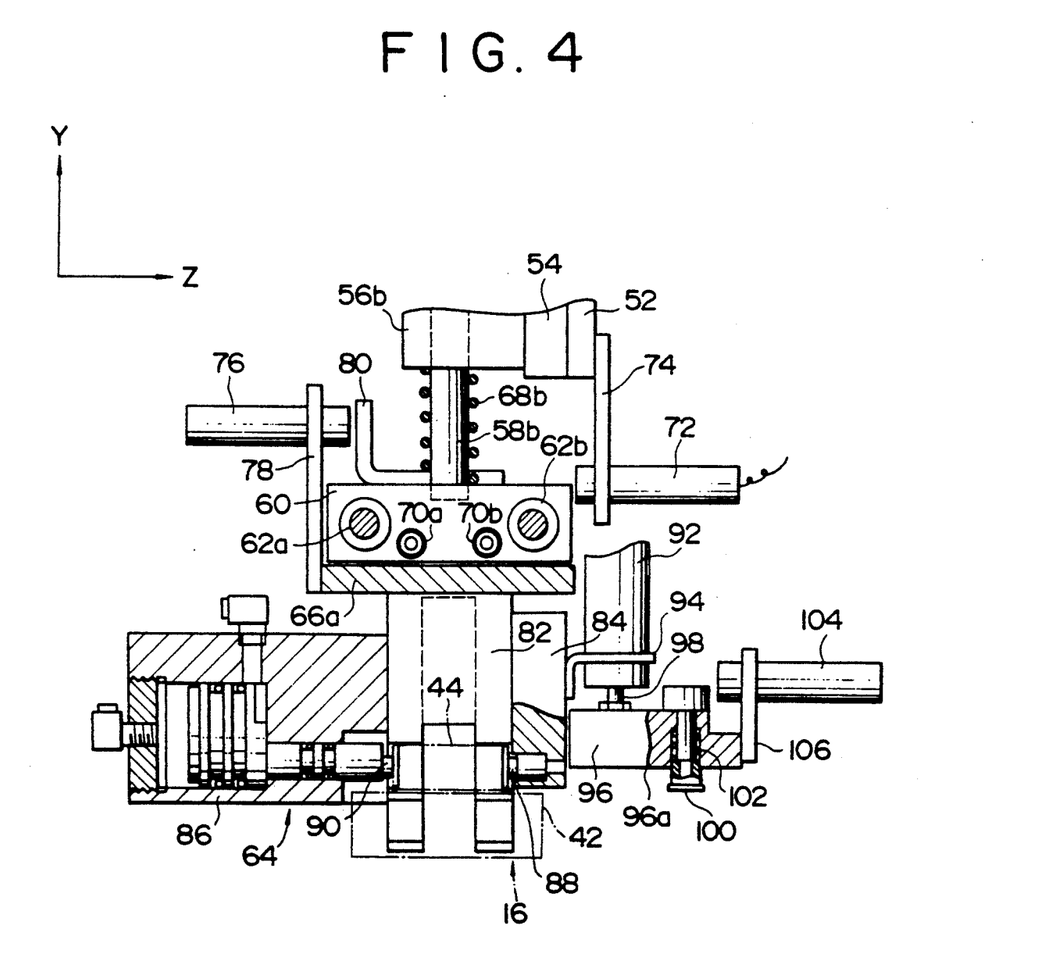
FIG. 4 is a view of the construction shown in the direction of an arrow A in FIG. 3.

A slide base 60 extending in the radial direction X is fixed to the lower ends of the first guide shafts 58a and 58b. A pair of second guide shafts 62a and 62b which are set to be parallel to each other and extend in the radial direction X are inserted into the slide base 60 and slidably supporting the slide base 60 in the radial direction X, as shown in FIG. 4 which is the view shown in the direction of the arrow A in FIG. 3. The second guide shafts 62a and 62b are arranged along a tangential direction Z defined by an extending direction of the tangent which touches the outer circumferential surface of the rim 20 at a location where the balance weight 16 is to be mounted.

The weight holder 32 further includes a chucking unit 64 for gripping the clip portion 44 of the balance weight 16, as shown in FIGS. 3 and 4. The chucking unit 64 is attached to both ends of each of the second guide shafts 62a and 62b, as shown in FIG. 3. More specifically, the chucking unit 64 includes a slide member 66 integrally consisting of a plate portion 66a provided beneath the slide base 60 and first and second upright portions 66b and 66c standing up at the both ends of the plate portion 66a along the axial direction, respectively. Note that the both ends of each of the first and second guide shafts 62a and 62b are connected to the first and second upright portions 66b and 66c, respectively.

That is to say, as shown in FIG. 3, the chucking unit 64 is supported to the manipulator 28 such that it can be movable in the radial direction X of the tire wheel 14 by a predetermined amount and in the central axial direction Y of the tire wheel 14 perpendicular to the radial direction X by a predetermined amount in the state that the balance weight 16 is abutted against the tire wheel 14.

A pair of first springs 68a and 68b are wound around the pair of first guide shafts 58a and 58b, respectively, located between the slide base 60 and the slide bearings 56a and 56b. The first springs 68a and 68b always urge the slide base 60 downward. A pair of second springs 70a and 70b are provided between the slide base 60 and the second upright portion 66c. The second springs 70a and 70b always urge the slide member 66 to move rightward in FIG. 3, i.e., outwardly in the radial direction X and always urge the slide base 60 to move leftward, i.e., inwardly in the radial direction X. Consequently, the balance weight 16 is urged so as to approach to the rim 20 by both of the first springs 68a and 68b and the second springs 70a and 70b.

Here, a first sensor 72 as an eddy current type proximity sensor is suspended by and mounted to the stationary bracket 52 of the angle adjustable unit 48 through a support plate 74, as shown in FIG. 4. When the second guide shafts 58a and 58b slides and moves in the central axial direction Y into the slide bearings 56a and 56b, respectively, and thus the slide base 60 is positioned at a predetermined location, the first sensor 72 senses the upper edge of the slide base 60 to thereby determine the positional relationship of the slide base 60 to the slide bearings 56a and 56b (i.e., the positional relationship of the slide base 60 with respect to the supporting plate 46).

Further, a second sensor 76 which is also an eddy current type proximity sensor is supported by a support arm 78 standing on the one side of the plate portion 66a of the slide member 66 while a member 80 to be sensed is disposed on the upper surface of the slide base 60. When the chucking unit 64 which is movable relative to the slide base 60 is positioned at a predetermined location with respect to the slide base 60 in the radial direction X, the second sensor 76 senses the member 80 to be sensed to thereby determine the positional relationship of the chucking unit 64 to the slide base 60.

The chucking unit 64 further includes a center block 82 fixed to the undersurface of the plate portion 66a of the slide member 66. The center block 82 has the cross sectional configuration thereof such that the predetermined posture of the balance weight 16 is regulated whereby the upper surface $\alpha$ of the clip portion 44 of the balance weight 16, the back surface $\beta$ of the clip portion 44 and the back surface $\gamma$ of the weight portion 42 (the opposite side of the opening P of the clip portion 44) are abutted against the center block, as shown in FIG. 3.

A side plate 84 is fixed to one side surface of the center block 82, while an air cylinder 86 for chucking is mounted to the other side surface of the center block 82, as shown in FIG. 4. To the side plate 84 is fixed a support pin 88 which extends in the tangential direction Z and the distal end of which is set to oppose one side surface of the clip portion 44 of the balance weight 16. The support pin 88 projects by a predetermined distance from the inner surface of the side plate 84 toward the air cylinder 86. The air cylinder 86 includes a piston rod 80 which extends and is slidable in the tangential direction Z and the distal end of which is set to oppose the other side surface of the clip portion 44. The support pin 88 and the piston rod 90 are aligned with each other.

The chucking unit 64 therefore can hold the balance weight 16 by actuating the chuck cylinder 86 to protrude the piston rod 90 toward the support pin 88 and thereby abutting the distal end of the piston rod 90 against the other side surface of the clip portion 44 and then contacting the one side surface of the clip portion 44 of the balance weight 16 with the distal end of the support pin 88, and thus can grip the clip portion 44 of the balance weight 16 between the support pin 88 and the piston rod 90.

As shown in FIG. 4, a sensing cylinder 92 as an air cylinder is mounted on the outside surface of the side plate 84 of the chucking unit 64 through a stay 94. A sensing block 96 is supported to the lower end of a piston rod 98 of the sensing cylinder 92. The sensing block 96 is provided with a probe 100 which is slidably inserted into the sensing block 96, and is set to be capable of projecting the lower end thereof downward from the under surface 96a of the sensing block 96 or the upper end thereof upward from the upper surface of the sensing block 96.

The probe 100 is always urged downward by a spring 102 which is provided between the probe 100 and sensing block 96. A third sensor 104 as an eddy current type proximity sensor of similar to the above first and second sensors 72, 76 is attached to the outside surface of the sensing block 96 through a stay 106, for sensing the upper end of the probe 100.

The third sensor 104 is set to not sense the upper end of the probe 100 when the probe 100 is projected downward in a free state, while it is set to sense the upper end thereof when the probe 100 is retracted (i.e., projecting upward) against the urging force of the spring 102 until a step defined between the under surface 96a of the sensing block 96 and the lower end surface of the probe 100 is equal to the thickness of the clip portion 44 of the balance weight 16. It should be noted that the direction in which the probe 100 slides is parallel with a hammering direction W of the hammer head 34 to be described later.

The balance weight 16 held by the chucking unit 64 of the weight holder 32 arranged as described above is abutted against and held at the predetermined location of the rim 20 of the tire wheel 14 supported on the turning table 38 of the tire wheel support unit 18 by the operation of the manipulator 28, in which location the balance weight 16 is to be mounted, in other words, the clip portion 44 of the balance weight 16 should be driven by the hammer head 34.

More specifically, the balance weight 16 supported by the chucking unit 64 is pressed against the rim 20 to be stably abutted against the rim in such a manner that the three points, e.g., an opening end D of the clip portion 44 of the balance weight 16, a shoulder portion (opening edge) E of the weight portion 42 confronting the opening end D of the clip portion 44 and the lower end F of the weight portion 42 are abutted against the rim 20, and then the balance weight 16 is further pressed against and urged to the rim 20 while maintaining this stable state.

With this operation, the slide base 60 is moved outwardly in the radial direction X of the tire wheel 14 with respect to the chucking unit 64 against second springs 70a, 70b, and the chucking unit 64 and slide base 60 are moved upward in the central axial direction Y of the tire wheel 14 against the first springs 68a and 68b, with the result that the balance weight 16 is urged to and abutted against the rim 20 by a predetermined urging force obtained by composing the urging forces of the first and second springs 68a, 68b, 70a and 70b.

It should be noted that the three points D, E and F may not be simultaneously abutted to the rim 20 due to the configurational error or the like, in the state that the balance weight 16 is restricted by the weight holder 32 (in the state that the balance weight 16 is gripped by the chucking unit 64). The balance weight 16, however, can be simulataneously abutted at the three points D, E and F even though the point F is not abutted, in such a manner that the balance weight 16 comes to be turned counterclockwise in FIG. 3 when the balance weight 16 is released from being gripped by the chucking unit 64, by suitably setting the direction of the composite force applied to the upper side surface and backside surface of the balance weight 16, i.e., the balance of the return forces of the first springs 68a and 68b and the second springs 70a and 70b.

Here, a large dimensional difference of the configuration and location of the rim 20 depending on the different sizes and types of the tire wheel 14 is coped with by the change of the location where the manipulator 28 is set. On the other hand, the small dimensional difference of the configuration and location of the rim 20 and errors arisen in the manufacturing process of the rim 20 are absorbed by the relative movement of the chucking unit 64 relative to the slide base 60 and the relative movement of the slide base 60 relative to the slide bearings 56a and 56b (i.e., the relative movement of the chucking unit 64 relative to the slide bearings 56a and 56b).

Further, when the balance weight 16 is abutted against and urged to the rim 20 by the predetermined urging force (i.e., when the slide base 60 is at the predetermined location with respect to the chucking unit 64 and the slide base 60 is at the predetermined location with respect to the chucking unit 64), the first sensor 72 is set to sense the slide base 92 and the second sensor 76 is also set to sense the member 80 to be sensed. As a result, it is conversely confirmed that the balance weight 16 is forced to be abutted against and urged to the rim 20 by a predetermined urging force when the first sensor 72 senses the slide base 92 and the second sensor 76 senses the member 80 to be sensed in this arrangement.

It should be noted that, needless to say, the locations where the slide base 60 and member 80 to be sensed are sensed by the first and second sensors 72 and 76, respectively, are determined, taking the difference of the configuration and location of the rim 20 caused by the types of the tire wheel 14 and the errors in the manufacturing process described above.

Figure 5:
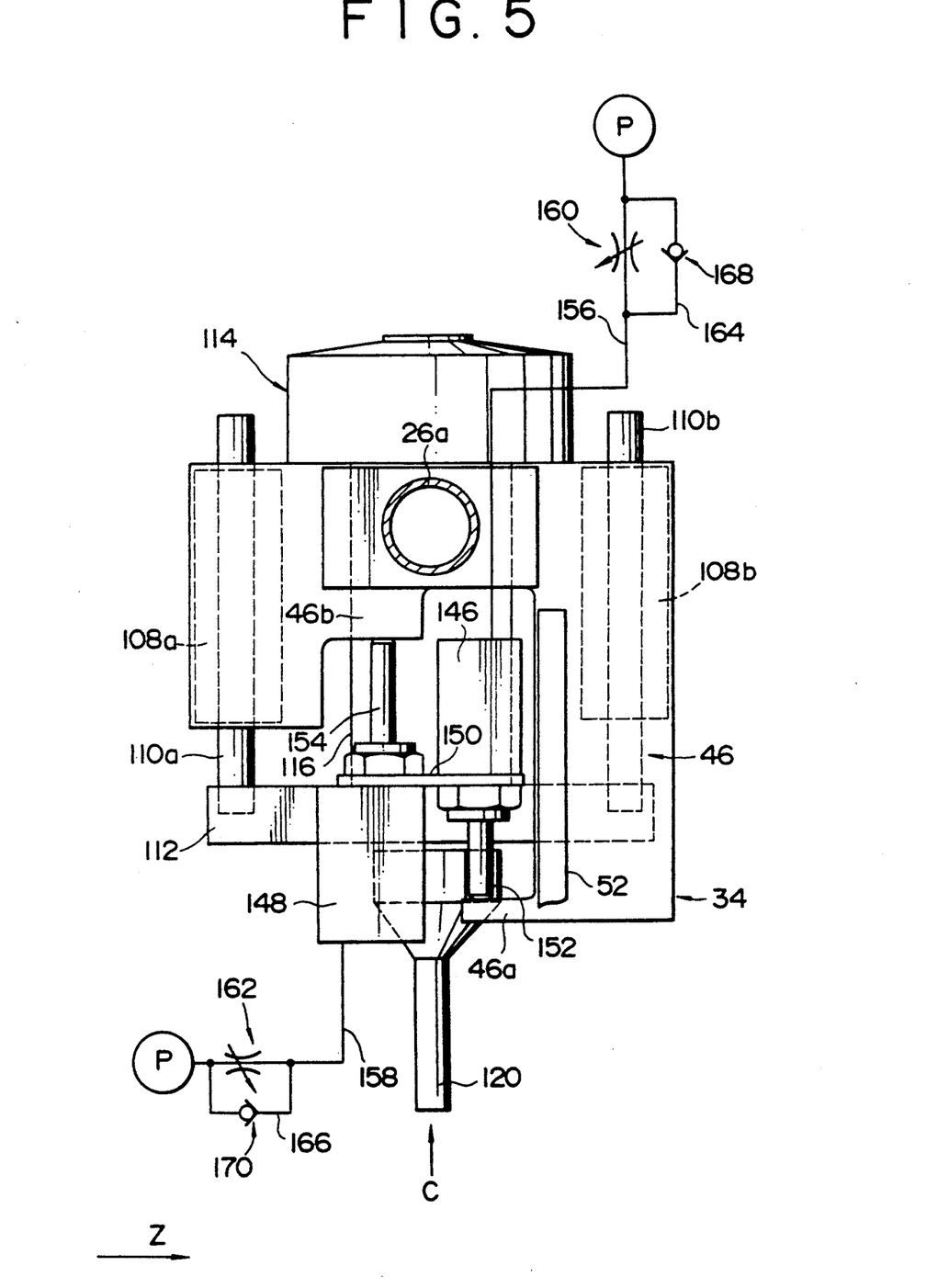
FIG. 5 is a view of the construction shown in the direction of an arrow B in FIG. 3.
Figure 6:
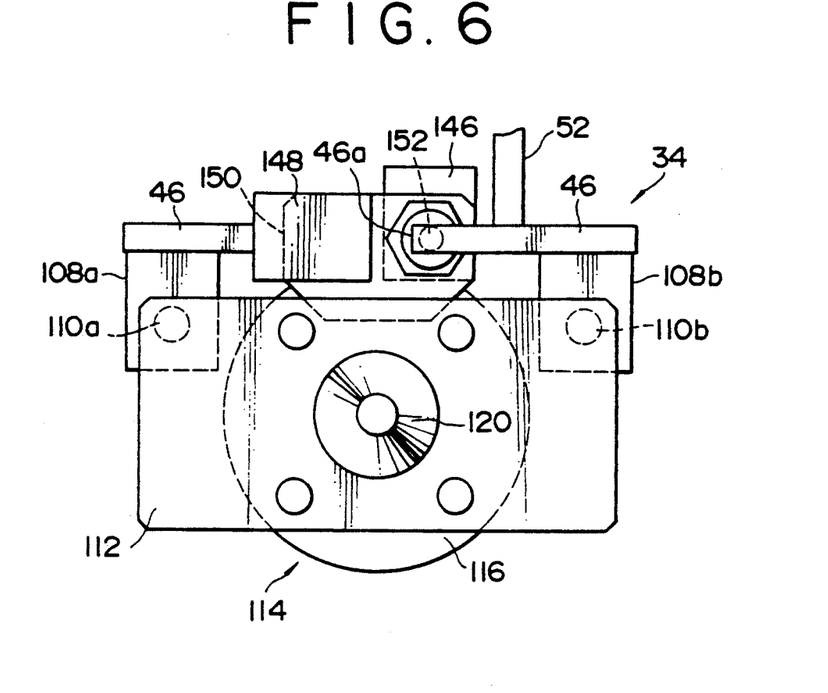
FIG. 6 is a view of the construction shown in the direction of an arrow C in FIG. 5.
Figure 7:
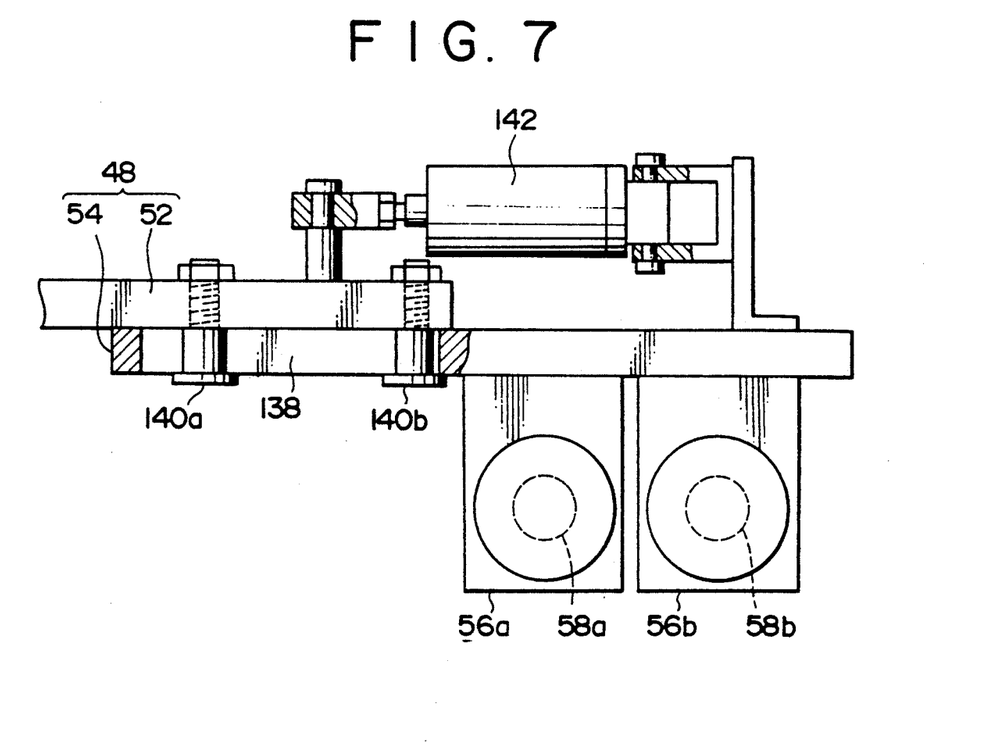
FIG. 7 is a plan view of a bracket in FIG. 3.

Hereinafter, the description of the hammer head 34 will be given with reference to the accompanying drawings of FIGS. 3, 5 and 6.

Firstly, the slide support unit 50 for slidably supporting the hammer head 34 includes a pair of slide bearings 108a and 108b arranged side by side along the tangential direction Z. The slide bearings 108a and 108b support a pair of slide guide shafts 110a and 110b, respectively. A support plate 112 is attached to the lower ends of the slide guide shafts 110a and 110b. A knocking unit 114 for driving the clip portion 44 of the balance weight 16 is attached to the support plate 112.

The knocking unit 114 includes a cylinder 116 similarly to a so-called air cylinder in which a piston 118 is slidably arranged. The knocking unit 114 has a hammer member 120 fixed at the protruded end of a piston rod 122 which is integrally formed with the piston 118, as shown in FIG. 5 which is a view showing in the direction of the arrow B in FIG. 3 and in FIG. 8 which is a view showing in the direction of the arrow C in FIG. 5. That is to say, the hammer head 34 is supported to the distal arm portion 26a through the slide support unit 50 to be movable in a direction along which the hammer member 120 thereof is advanced to be driven (i.e., along an extending direction of the central axis of the knocking unit 114) onto the clip portion 44 of the balance weight 16 held by the chucking unit 64 of the weight holder 32.

The knocking unit 114 further includes a ring-shaped pressure accumulation chamber 124 which is arranged in the upper end of the cylinder 116 and an umbrella-shaped valve 126 which is interposed between the pressure accumulation chamber 124 and the cylinder 116. The umbrella-shaped valve 126 is switched so that compressed air supplied from a compressed air supply source (pump P) is flown into the pressure accumulation chamber 124 through an air path 128 having a three-way valve 130 disposed in the midway thereof and the pressure accumulation chamber 124 is communicated with the cylinder 116 by the internal air pressure in the pressure accumulation chamber 124 when an air pressure is not applied to the pressure accumulation chamber 124.

Further, the piston 118 slidably inserted into the cylinder 116 is urged to and pressed against the rear end of the cylinder 116 by a spring 132. A pair of exhaust holes 134 and 136 are formed to the predetermined locations of a cylinder wall of the cylinder 116 and positioned at the lower side of and the upper side of the piston 118, respectively, when the piston 118 is moved downward to a location shown by the imaginary line in FIG. 3.

The compressed air supplied through the air path 128 causes the umbrella-shaped valve 126 to move downward and thus is accumulated in the pressure accumulation chamber 124, and when the three-way valve 130 is actuated to communicate the cylinder 116 with the atmosphere thereafter, the umbrella-shaped valve 126 is moved upward by the air pressure in the pressure accumulation chamber 124, and thus the air in the pressure accumulation chamber 124 is flown into the cylinder 116 and applied to the piston 118 so that the piston 118 is strongly moved downward against the urging force of the spring 132. It should be noted that the switching operation of the three-way valve 130 is executed by the controller 36.

As shown in FIG. 3, the positional relationship of the knocking unit 114 to the weight holder 32 is set in such a manner that when the weight holder 32 presses the balance weight 16 held thereby against the rim 20 at the predetermined location thereof, the extending direction along which the hammer member 120 of the knocking unit 114 is driven (i.e., the hammering direction) is positioned between the open end D of the clip portion 44 and the shoulder portion E of the weight portion 42 or is positioned near to the shoulder portion E within the range of the open end D of the clip portion 44 where the balance weight 16 is abutted against the rim 20 and the lower end F of the weight portion 42. The lower end of the hammer 52 fixed to the lower end of the piston rod 122 comes into collision with the clip portion 44 of the balance weight 16 held by the chucking unit 64 of the weight holder 32 while the piston 118 is being moved forward.

Further, as apparent from the piston 118 shown by the imaginary line in FIG. 3, the exhaust holes 134 and 136 are defined at the lower and upper locations of the cylinder wall of the knocking unit 114, respectively, to enable the inside of the cylinder 116 at the lower side of and the upper side of the piston 118 to communicate with the outside through these exhaust holes 134 and 136 when the hammer member 120 comes into collision with the clip portion 44 of the balance weight 16.

As a result, when the hammer member 120 comes into collision with the clip portion 44, the piston 118 is moved by the inertia thereof, and thus when the hammer member 120 comes into collision with the clip portion 44 and is abruptly stopped, the reaction force through the air in the cylinder 116 is not applied to the cylinder 116 and thus the force applied to the cylinder 116 is prevented from being applied, as it is, to the arm 26 of the manipulator 28 having a relatively small load resistance.

When the balance weight 16 is gripped to the rim 20 of the tire wheel 14 having a different configuration by the same weight holder 32 or a balance weight for an aluminum wheel and a balance weight for a steel wheel are gripped by the same weight holder 32, it is contemplated that the balance weight 16 can be mounted better by changing the relative angle defined between the weight holder 32 and the knocking unit 114. Accordingly, as show in FIG. 3 and in the plan view of FIG. 7, The angle adjustable unit 48 for supporting the weight holder 32 to the distal arm portion 26a has a double bracket structure in this embodiment so that the relative angle therebetween can be variably adjusted.

More specifically, an arc-shaped slot 138 is formed on the swingable bracket 54 fixed to the weight holder 32 about the center of an imaginary position to which the balance weight 16 is to be mounted. A pair of guide pins 140a and 140b which is passing through the slot 138 is threadedly engaged with the stationary bracket 52 fixed to the support member 46. A swingable air cylinder 142 is swingably connected to the swingably bracket 54 at the rear end thereof. The air cylinder 142 includes a piston rod 144 which is capable of extending therefrom or retracting thereto and the distal end of which is swingably supported to the stationary bracket 52.

Accordingly, when the swingably driven air cylinder 124 is actuated, the weight holder 32 is swung about the imaginary location with respect to the knocking unit 114, whereby the relative angle between the weight holder 32 and the knocking unit 114 can be variably adjusted.

Further, the knocking unit 114 has two air cylinders 146 and 148 for damping the knocking impact of the hammer member 120, which cylinders are disposed in parallel thereto. The cylinders 146 and 148 are supported to a support plate 150 fixed to the supporting plate 112 on which the cylinder 116 is mounted. The cylinders 146 and 148 include piston rods 152 and 154, respectively, with the projecting or distal ends of the piston rods 152 and 154 thereof being directed to opposite directions to each other. The distal ends of the piston rods 152 and 154 of both air cylinders 146 and 148 are set to be abutted against abutting portions 46a and 46b, respectively, which are integrally formed with the support member 46.

Thus, the movement of the knocking unit 114 with respect to the support member 46 (i.e., the movement of the knocking unit 114 to the distal arm portion 26a of the manipulator 28) whereby the slide guide shafts 110a and 110b slide through the slide bearings 108a and 108b, respectively, is regulated by supplying the air into the cylinders 146 and 148 thereby contacting the distal ends of the piston rods 152 and 154 with the abutting portions 46a and 46b, respectively.

A pair of air paths 156 and 158 are provided between the air cylinders 146 and 148 and the pump P, respectively, for supplying compressed air from the pump P to the air cylinders 146 and 148 for functioning as the dampers. The air paths 156 and 158 are provided with flow control valves 160 and 162, respectively. A pair of bypasses 164 and 166 bypassing these flow control valves 160 and 162 are attached to the air paths 156 and 158, respectively. The bypasses 164 and 166 are provided with check valves 168 and 170 to enable the air flow from the air cylinders 146 and 148 to the air pump P (i.e., air supply side).

As a result, when the air pressure is applied to the piston rods 152 and 154 in the air cylinders 146 and 148, respectively, the air in the air cylinders 146 and 148 is compressed to act as an air spring as well as moved to the air supply side through the air paths 156 and 158, bypasses 164 and 166 and check valves 168 and 170, and when the pressure is released, the air moved to the air supply side is returned to the air cylinders 146 and 148 though the flow control valves 160 and 162, respectively. Thus, the flow control valves 160 and 162 are serving as orifices, respectively, and it is established that the air cylinders 146 and 148 with the air paths 156 and 158, the flow control valves 160 and 162, bypasses 164 and 166 and the check valves 168 and 170 totally construct the dampers, respectively.

More specifically, the force applied along the axial direction of the knocking unit 114 is damped by the air cylinders 146 and 148 serving as the dampers. As described above, although the knocking unit 114 is arranged to prevent the reaction force caused when the hammer member 120 comes into collision with the clip portion 44 from being applied to the cylinder 116, the reaction force caused when the air in the pressure accumulation chamber 124 is flown into the cylinder 116 and applied to the piston 118 is supplied to the cylinder 116, and a certain amount of a reaction force is applied to the cylinder 116 when the hammer member 120 comes into collision with the clip portion 44, because the areas of the exhaust holes 134 and 136 formed to the cylinder wall of the cylinder 116 is limited. Therefore, these forces (that is, reaction forces) applied to the cylinder 116 are received and damped by the air cylinders 146 and 148 thereby to prevent these forces from being applied to the manipulator 28.

It should be noted that an arrangement for damping these forces from the cylinder 116 and preventing same from being applied to the manipulator 28 is not limited to the above arrangement but can be suitably changed by employing, for example, a hydraulic damper, or the like.

The description of the operation of the balance weight mounting apparatus 12 arranged as described above will be given hereinafter.

First, the manipulator 28 is actuated to cause the chucking unit 64 of the weight holder 32 to be moved to the location to which the balance weight 16 is fed by the parts feeder 24 and the balance weight 16 to be abutted against the center block 82 of the weight holder 32 in the regulated attitude (in the state that the surfaces $\alpha$ and $\beta$ of the clip portion 44 and the surface $\gamma$ of the weight portion 42 of the balance weight 16 are abutted as shown in FIG. 3), and then the chuck cylinder 86 is driven to protrude the piston rod 90 so that the clip portion 44 of the balance weight 16 is pressed by the piston rod 90 toward the support pin 88 and gripped between the piston rod 90 and the support pin 88 at the both ends thereof to thereby hold the balance weight 16.

Next, the balance weight 16 held by the weight holder 32 is pressed against that portion of the rim 20 of the tire wheel 14 supported by the tire wheel support unit 18, on which the balance weight 16 is to be mounted, with a predetermined attitude and a predetermined force capable of driving the clip portion 44, while absorbing small dimensional errors of the configuration and location of the rim 20 caused by the type of the tire wheel 14 and the errors thereof in a manufacturing process, through the relative movement of the chucking unit 64 to the slide base 60 and the relative movement of the slide base 60 to the slide bearings 56a and 56b, as described above.

When the balance weight 16 gripped by the chucking unit 64 would be released from the weight holder 32 at this stage, the balance weight 16 could be abutted against the rim 20 at the three points thereof by turning the balance weight 16 even through the balance weight 16 has not abutted against the rim 20 at these three points, as described above. It should be noted that the balance weight 16 may be continuously gripped by the weight holder 32.

Further, at this time, the first proximity sensor 72 should sense the slide base 60 and the second proximity sensor 76 should sense the member 80 to be sensed. When, however, the first or second sensor 72 or 76 does not sense the slide base 60 or the member 80 to be sensed regardless of that the distal arm portion 26a of the arm 26 of the manipulator 28 (i.e., the weight holder 32) is correctly positioned with respect to the tire wheel 14, it can be recognized that the balance weight 16 is not properly held by the weight holder 32 or any other trouble arises.

Thereafter, the three-way valve 130 interposed to the air path 128 for supplying compressed air to the cylinder 116 is actuated such that the cylinder 116 is set to be communicated with the atmosphere under the condition where the balance weight 16 is pressed against the proper location with respect to the tire wheel 14. Then, the knocking unit 114 is actuated to allow the hammer member 120 to strike the clip portion 44 of the balance weight 16.

As described above, the direction of collision of the hammer member 120 with respect to the clip portion 44 is set to be positioned between the distal end D of the clip portion 44 abutted against the rim 20 and the shoulder portion E of the weight portion 42, or near to the shoulder portion E, and thus the balance weight 16 is driven into the rim 20 by the impact force of collision of the hammer member 120 (in other words, the rim 20 is inserted and clamped between the weight portion 42 and clip portion 44 of the balance weight 16).

Figure 8:
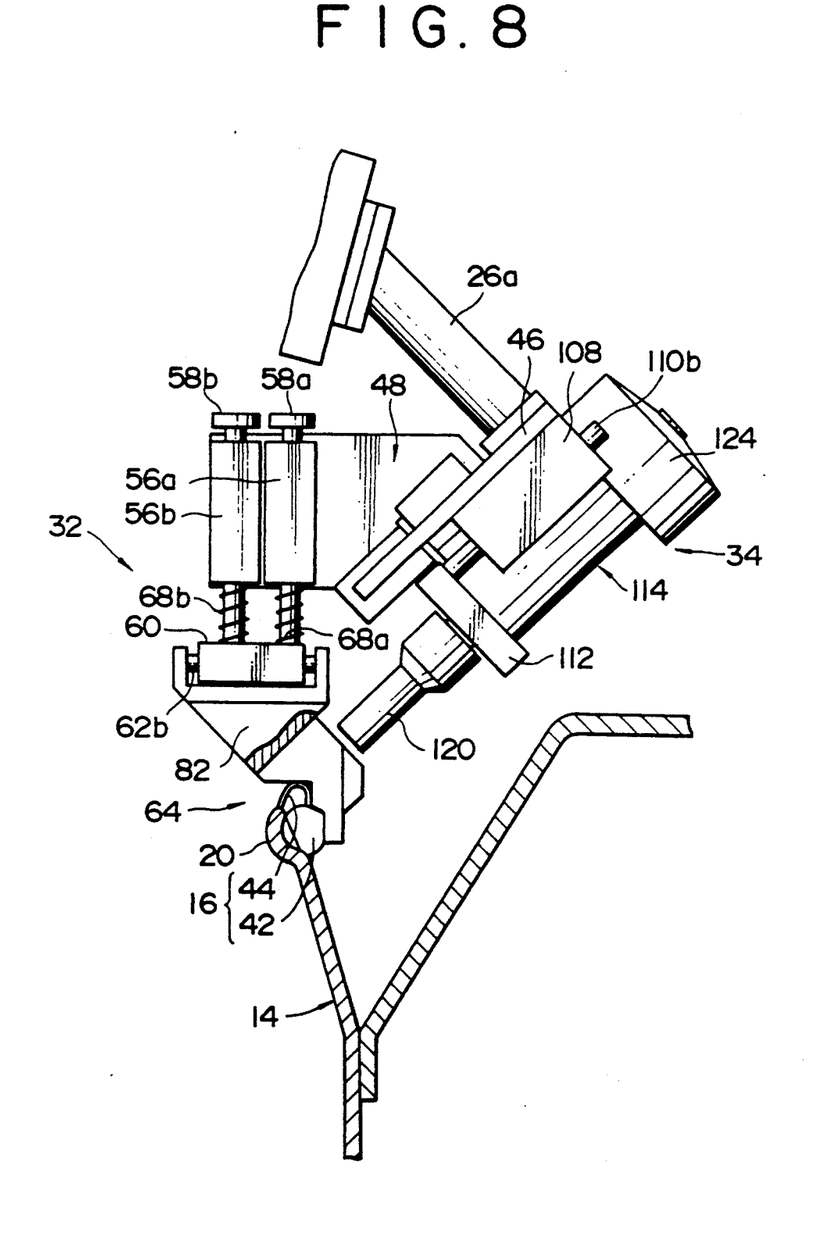
FIG. 8 is an enlarged front view of a weight holder and hammer head portion when the balance weight is attached and is first driven.
Figure 9:
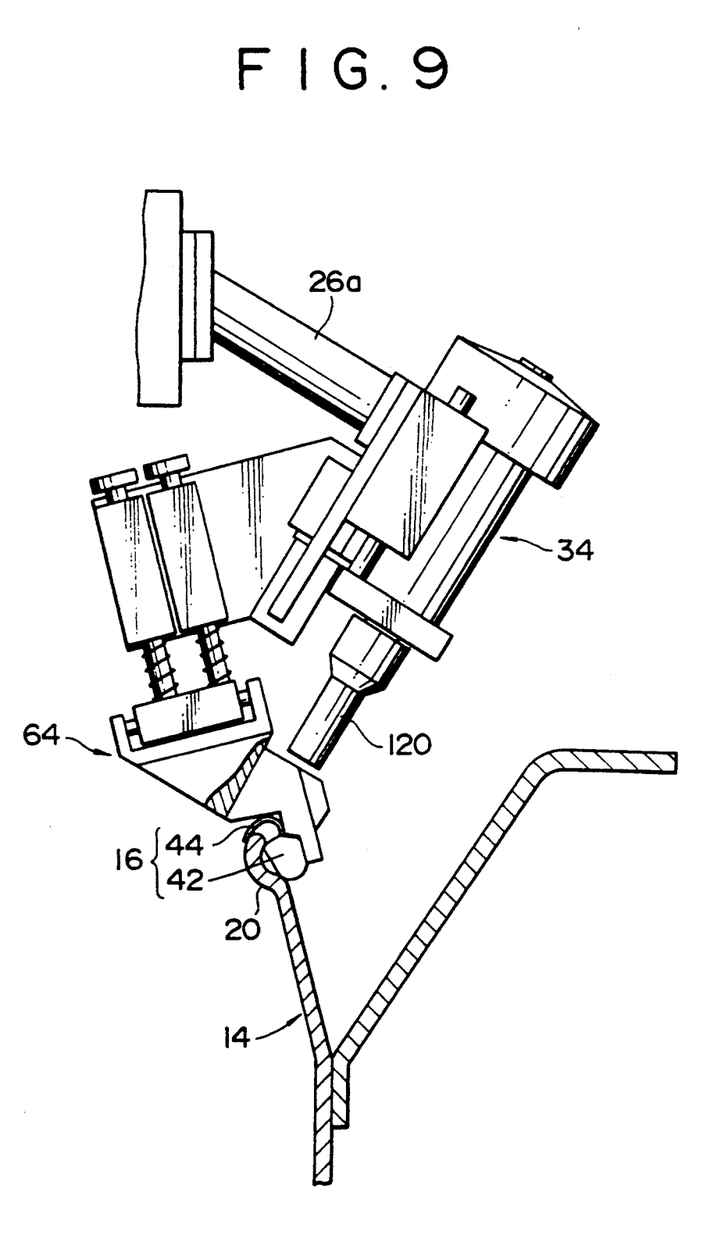
FIG. 9 is an enlarged front view of a weight holder and hammer head portion when the balance weight is attached and is second driven.
Figure 10:
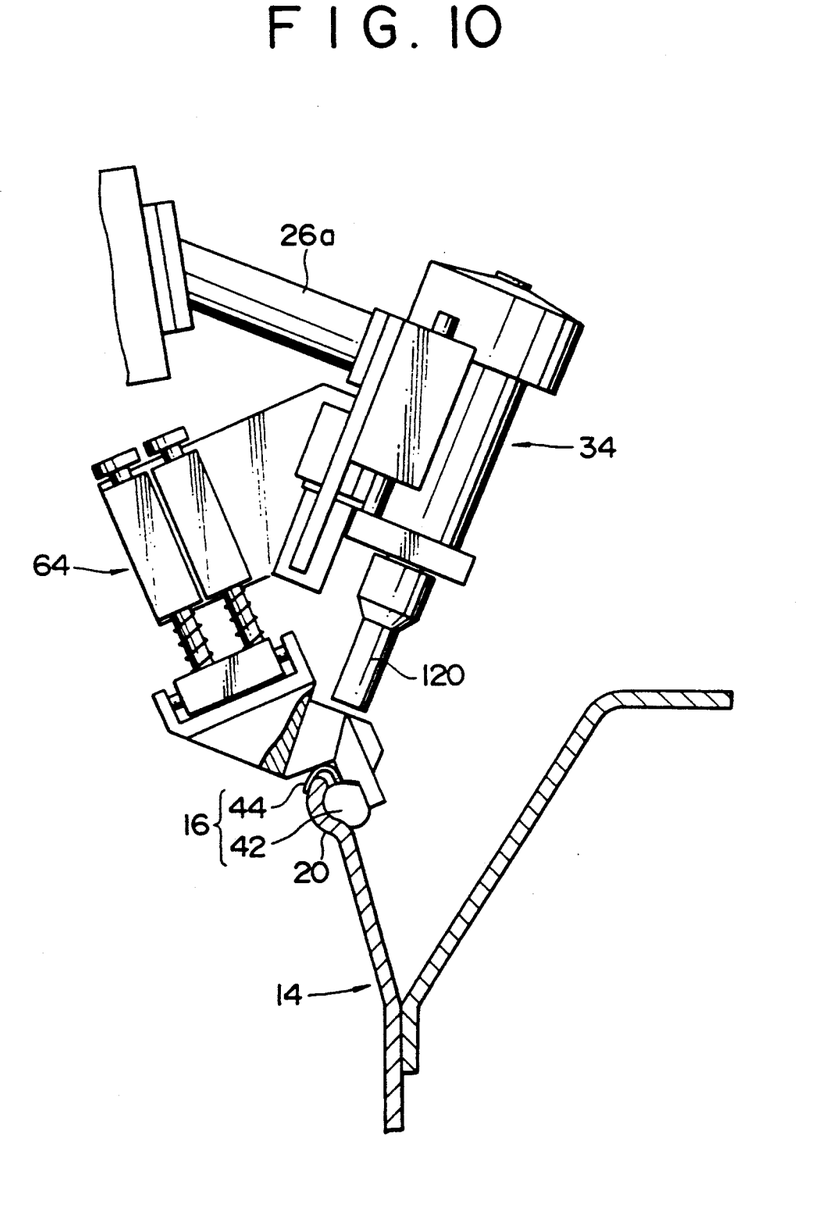
FIG. 10 is an enlarged front view of a weight holder and hammer head portion when the balance weight is attached and third driven.

Here, as shown in FIGS. 8 through 10, the balance weight 16 can be perfectly driven into and mounted on the rim 20 in such a manner that the angle of the hammer head 34 relative to the distal arm portion 26a is changed so that the direction in which the hammering operation is carried out by the hammer head 34 is directed to the corresponding direction which extends along the tangential line touching to the arc of the rim 20 and the balance weight 16 is driven a plurality of times (three times in this embodiment).

More specifically, as the attitude of the balance weight 16 is changed along the arc of the rim 20 according to (an amount) of the balance weight 16 fitted into the rim 20, the angle of the hammer head 34 relative to the distal arm portion 26a is changed in the plane perpendicular to the circumferential direction of the tire wheel 14 to enable the hammer head 34 to follow the change of the attitude while the hammering operation is carried out a plurality of times. It should be noted that the change of the relative location between the balance weight 16 (i.e., chucking unit 64) and a main body of the weight holder 32 on the side of the manipulator 28 caused by the change of the attitude of the balance weight 16 and the change of the angle of the hammer head 34 is absorbed through the relative movement of the chucking unit 64 to the slide base 60 and the relative movement of the slide base 60 to the slide bearings 56a and 56b.

Further, it can be confirmed that the balance weight 16 has been inserted into the rim 20 by that the first or second proximity sensor 72 or 76 does not sense the slide base 60 or the member 80 to be sensed based on the relative movement of the chucking unit 64 to the slide base 60 and the relative movement of the slide base 60 to the slide bearings 56a and 56b following the insertion of the balance weight 16 into the rim 20.

Thereafter, the manipulator 28 is actuated to move the chucking unit 64 to the location where the under surface 96a of the sensing block 96 supported to the side of the chucking unit 64 faces to that portion of the outer surface of the clip portion 44 which has been mounted to the rim 20 and the probe 100 faces to that portion of the outer surface of the rim 20 which is adjacent to the clip portion 44. Then, the sensor cylinder 92 is actuated to cause the under surface 96a of the sensing block 96 to be abutted against the outer surface of the clip portion 44. When the third sensor 104 senses the upper end of the probe 100 at this time, it can be confirmed that the balance weight 60 has been properly mounted on the rim 20 (the clip portion 44 has been perfectly driven). On the other hand, when the third sensor 104 does not sense the upper end of the probe 100 at this time, it can be confirmed that the balance weight 60 has not been mounted on the rim 20 (the clip portion 44 has not been properly driven.)

After the balance weight 16 has been mounted on one side of the tire wheel 14 (the upper side in the above embodiment) as described above, the tire wheel 14 is turned according to the turning of the turning table 38 so that the other side (the lower side) of the tire wheel 14 on which the other balance weight 16 is to be mounted is positioned at a predetermined location with respect to the balance weight mounting apparatus 12 and the other balance weight having a predetermined weight is mounted thereon in the same way as above (however, from the lower side), whereby the balance weight mounting operation will be finished.

It would be clear that the present invention is not limited to the embodiment described above, nor those illustrated in the drawings, and the invention can be modified without departing from the spirit and scope of the claimed invention.

For example, although the eddy current type proximity sensor is used as the first to third sensors 72, 76 and 104 and the location of the chucking unit 64 and whether or not the balance weight 16 has been properly mounted are confirmed by the ON/OFF results thereof in this embodiment, it is needless to say that a photo sensor or limit switch may be used to confirm whether or not the balance weight 16 has been properly mounted.

Figure 11:
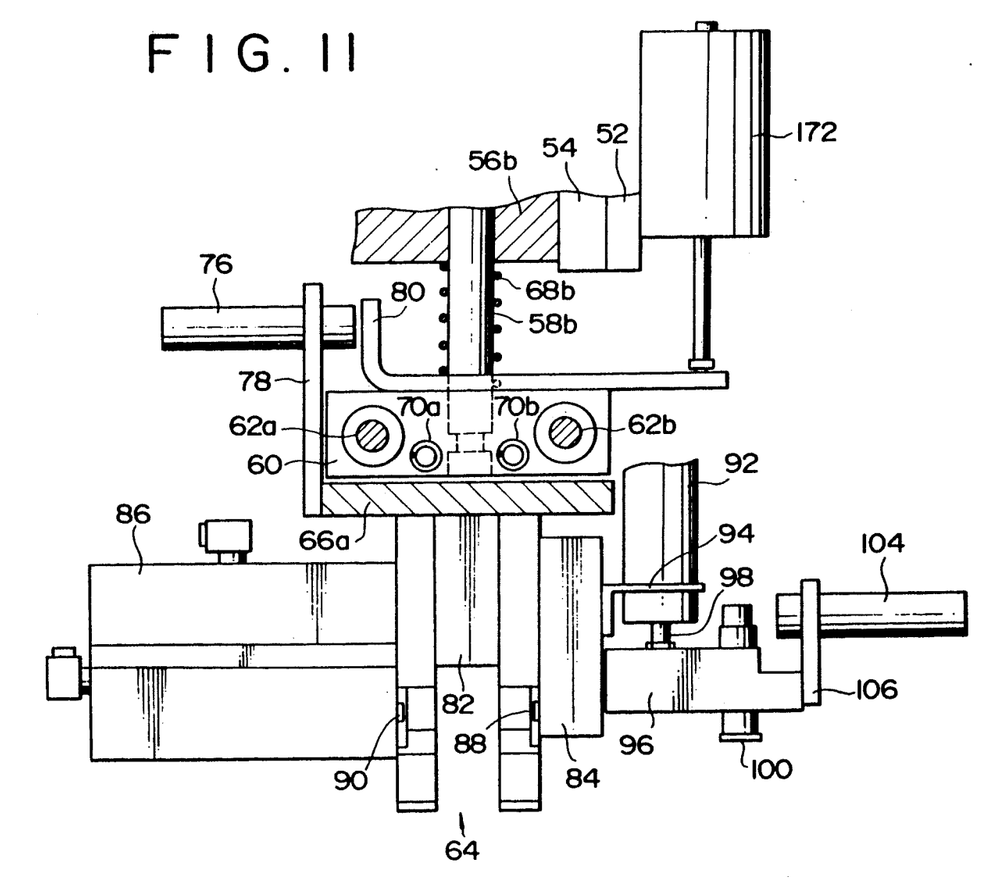
FIG. 11 is a view showing an example of a mounting structure of a different sensor.

Further, the location detection and/or confirmation may be executed by using a senor capable of sensing a positional dislocation, as an modification thereof shown in FIG. 11, which shows the state that a linearly changing type potentiometer 172 is mounted in place of the first sensor 72 in the above modification.

Further, the hammering operation of the hammer head 34 is carried out three times in the description of the above embodiment, it may be carried out any times so long as the balance weight 16 is perfectly driven into the rim 20, and thus the number of the hammering may be of course suitably set to one time or four times or more.

According to the tire wheel balance weight mounting apparatus according to the present invention as described above, a dangerous balance weight driving operation of job which is bad in workability and conventionally carried out manually can be completely automatically carried out, which contributes to the improvement of the working efficiency.

What is claimed is:

1. A tire wheel balance weight mounting apparatus for mounting a balance weight on a rim of a tire wheel, said balance weight having a weight portion and a clip portion, said apparatus comprising:

weight holding means including a chucking unit having two end surfaces spaced apart along a direction in which said rim extends, said surfaces clamping therebetween said clip portion of said weight;

moving means for moving the weight holding means so that the balancing weight held by said weight holding means may be abutted against an outer edge of the rim; and hammering means for hammering the clip portion of said balancing weight held by said weight holding means to a side of said rim.

2. The apparatus according to claim 1, which further comprises:

wheel support means for supporting said tire wheel and moving that portion of the rim of the tire wheel on which the balance weight is to be mounted to a predetermined location which is disposed within a movable range of said moving means.

3. The apparatus according to claim 2, wherein said moving means includes a manipulator to which said holding means and hammering means are supported, for moving it at least within a plane perpendicular to the circumferential direction of said tire wheel supported by said wheel support means.

4. The apparatus according to claim 3, wherein said hammering means includes a hammer member moved by air pressure and driven by inertia to be driven to the clip portion.

5. The apparatus according to claim 4, wherein said manipulator is provided with an arm movable within said movable range, and said hammering means is supported to a distal end of the arm of said manipulator.

6. The apparatus according to claim 5, which further comprises:

impact absorbing means, disposed between the hammering means and the distal end of said arm, for absorbing the impact load to the manipulator at the hammering operation of said hammering means in a hammering direction along which said hammer member moves and am impact load is applied.

7. The apparatus according to claim 6, wherein said impact absorbing means allows said hammering means to move in the hammering direction and is provided with fluid cylinders for regulating the movement of said hammering means.

8. The apparatus according to claim 3, wherein said weight holding means further includes;

movable support means for movably supporting the chucking unit by a predetermined distance in a direction for approaching to and retracting from the rim of said tire wheel with respect to said manipulator, and urging means for urging said chucking unit toward said rim.

9. The apparatus according to claim 8, wherein said movable support means is constructed to support the chucking unit such that it can be moved substantially in a radial direction of said tire wheel with respect to said manipulator and also in a substantial central axial direction of said tire wheel perpendicular to said radial direction, when the balance weight is mounted, whereby said weight holding means approaches to and retracts from said rim of said tire wheel by the movement in said both directions.

10. The apparatus according to claim 3, wherein said weight holding means further includes;

a horizontal direction guide member which extends to be substantially parallel with a radial direction of said tire wheel, for guiding said chucking unit to be slidably movable along said substantially radial direction of said tire wheel when said balance weight is mounted, and horizontal direction urging means for urging the chucking unit toward said rim, whereby said chucking unit can be biased in the substantially radial direction of said tire wheel with respect to said manipulator.

11. The apparatus according to claim 3, wherein said weight holding means further includes;

at least one vertical direction guide member which extends to be substantially parallel with central axial direction of said tire wheel, for guiding said chucking unit to be slidably movable along said substantially central axial direction of said tire wheel when the balance weight is mounted, and vertical direction urging means for urging the chucking unit toward said rim, whereby said chucking unit can be biased in the substantially central axial direction of said tire wheel with respect to said manipulator.

* * * * *